May 20, 1952 — L. M. MICHARD — 2,597,663
ENGINE COWL FOR AIRCRAFT
Filed Dec. 5, 1946 — 4 Sheets-Sheet 1
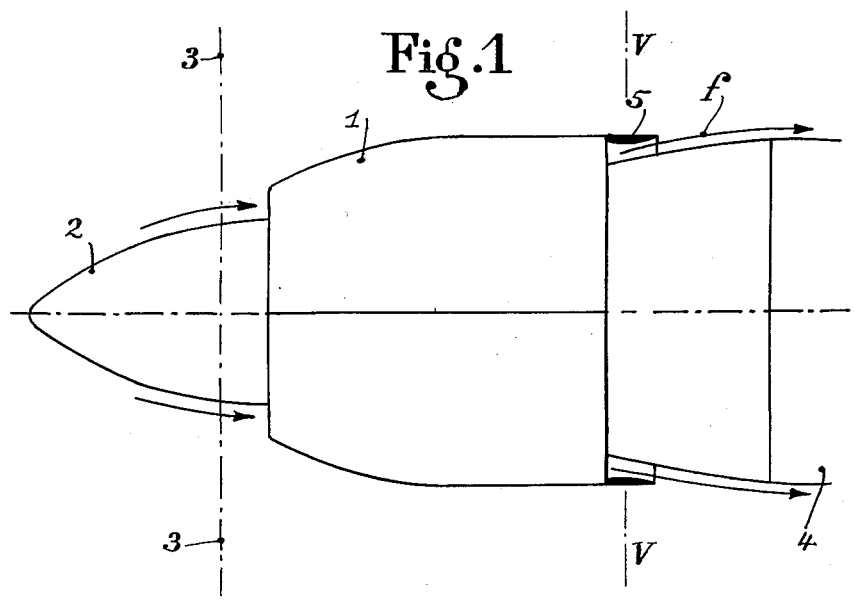
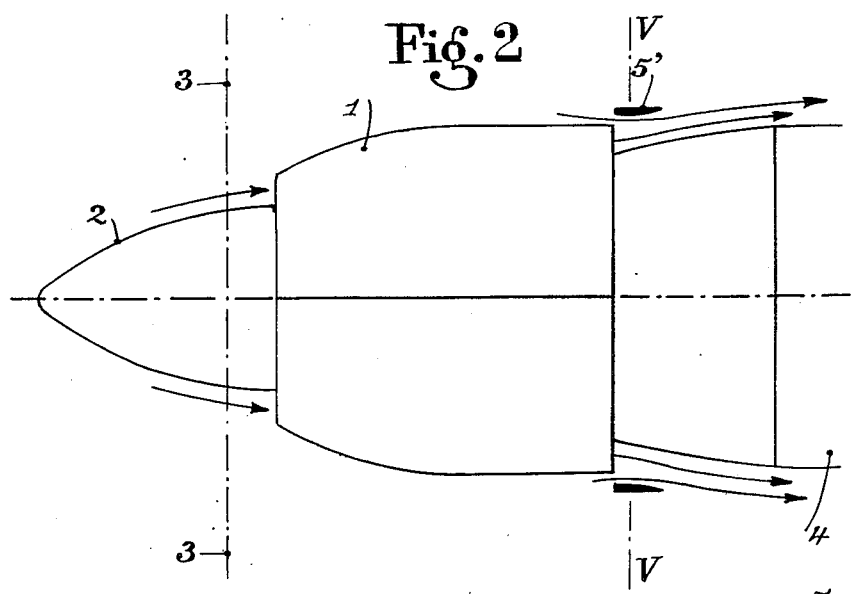
Inventor
LOUIS MARY MICHARD,
By William C. Sinton
Attorney Inventor
LOUIS MARY MICHARD
By William C. Linton.
Attorney May 20, 1952 — L. M. MICHARD — 2,597,663
ENGINE COWL FOR AIRCRAFT
Filed Dec. 5, 1946 — 4 Sheets-Sheet 4

Inventor
LOUIS MARY MICHARD,
By William C. Linton
Attorney

Patented May 20, 1952

2,597,663

UNITED STATES PATENT OFFICE 2,597,663

ENGINE COWL FOR AIRCRAFT

Louis Mary Michard, Fontenay Aux Roses, France, assignor to Societe dite: Societe Nationale d'Etude et de Construction de Moteurs d'Aviation, Paris, France, a French company Application December 5, 1946, Serial No. 714,253
In France December 19, 1945

23 Claims. (Cl. 123—41.59)

The present invention relates to an engine cowl for aircraft and an engine unit provided with such an engine cowl.

According to this invention, an engine cowl for aircraft includes an adjustable arrangement disposed rearwardly of the said cowl for increasing temporarily the rate of flow of the cooling air in its interior during forward movement of the engine.

In such an engine cowl, means may be disposed rearwardly of the cowl and movable in a generally diametrical direction into positions to define, at least, one part of a circumferential zone exterior to the main portion of the cowl, whereby, during forward movement of the engine, air may pass through said part and increase the rate of flow of the cooling air in the cowl interior.

The increase of the rate of flow of the cooling air in the cowl interior is, preferably, obtained by a ring disposed rearwardly of the cowl, the said ring being provided with means movable in a generally diametrical direction into positions to define, at least, one part of a circumferential zone exterior to the main portion of the cowl, whereby, during forward movement of the engine, air may pass through said part and effect an aspiration of air in the cowl interior.

Preferably, the said ring has, longitudinally, a trumpet shaped section.

According to the invention, an engine cowl for aircraft may include an expandable and contractable ring mounted at the rear of the cowl, the said ring having, longitudinally, a trumpet shaped section and being formed by stationary circular segments carrying movable circular segments.

Preferably, in such a ring, the movable circular segments are provided with means for regulating their distance from the axis of the cowl.

Thus, the movable segments may be mounted on parallel slides perpendicular to the axis of the cowl.

These movable segments may, also, be hung from pivoted levers of which the axles are fixed to the fixed segments and parallel to the axis of the cowl.

In this latter case, at each of its extremities, each movable segment may be linked to a pivoted lever of which the axle is carried by the cowl and one, at least, of these levers is positively actuated.

Preferably, the said positively actuated lever is connected to an undriven lever through a toothed sector, a circular rack, a member in the form of a circular arc, a second rack, a toothed sector, and a connecting rod linked to the said sector and the second pivoted lever opposed to the driven lever.

Furthermore, according to the present invention, in an engine cowl for aircraft including an expandable and contractable ring mounted at the rear of the cowl, having longitudinally a trumpet shaped section and formed by stationary circular segments carrying movable circular segments, for connecting each movable segment to the adjacent stationary segment, a circumferential shutter may be provided; each of these shutters may be mounted at one of the circumferential ends of the corresponding stationary segment.

Each of these shutters may be flexible in a circumferential direction and mounted at one of the circumferential ends of this segment.

For positively actuating the movable segments, a motor may be provided; and said motor may be, for instance, a motor cylinder having fluid under pressure or an electric motor.

At least, the invention includes, also, the unit formed by the combination of an aircraft engine and a cowl including means for increasing temporarily the rate of flow of the cooling air in its interior during forward movement of the engine.

The diagrammatic drawings appended, given by way of example, and which do not in any manner limit the scope of the present invention refer to a motor cowl for an aeronautic machine constructed in conformity with the principles above defined.

In these drawings:

Fig. 1 is an elevation of a cooled aircraft engine in accordance with the invention, with a cowl having an extensible rear ring, the ring being represented in section and in its contracted position.

Fig. 2 is a view similar to Fig. 1, the same ring being represented in its expanded position.

Figure 3:
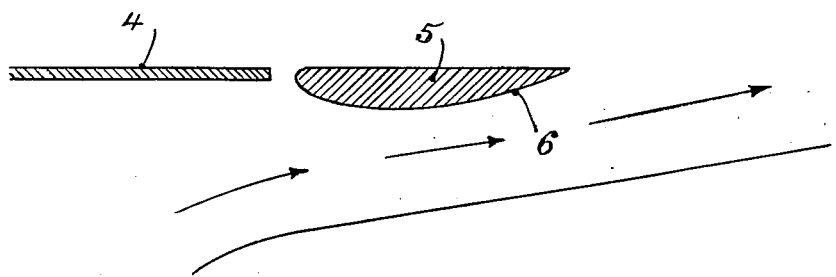
Fig. 3 shows on a larger scale and in semi-section, one part of the ring in its contracted position.
Figure 4:
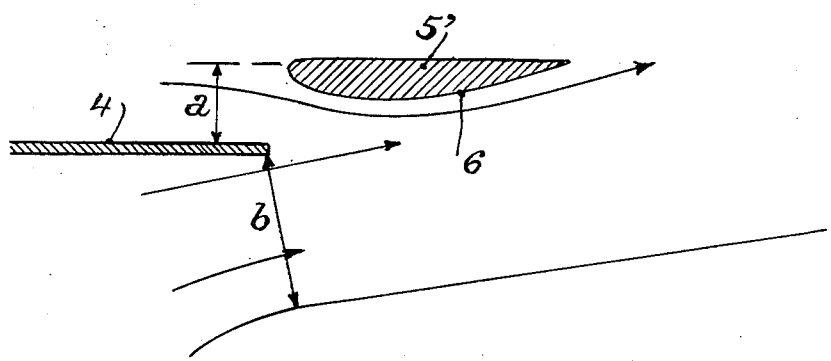

Fig. 4, similar to Fig. 3, shows the same part of the ring in its expanded position.

Figure 5:
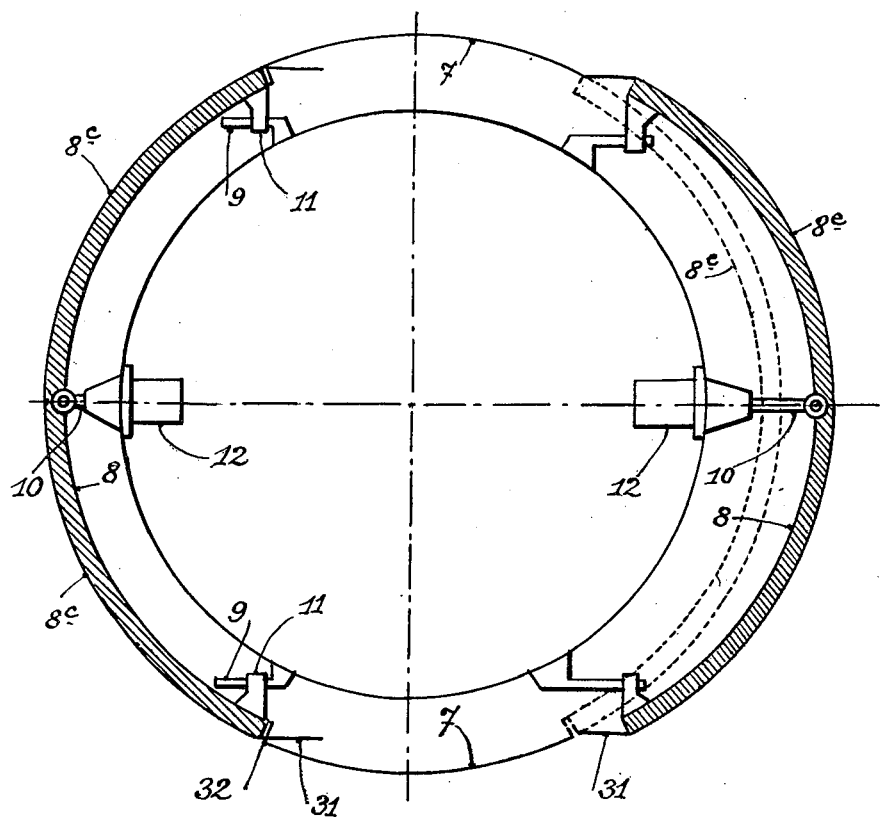

Fig. 5 shows, on a large scale and in section along the lines V—V of Figs.. 1 and 2, a first construction of the contractable ring in accordance with the invention, the left part of the ring being in its contracted position and the right part of the same ring, in its expanded position.

Figure 6:
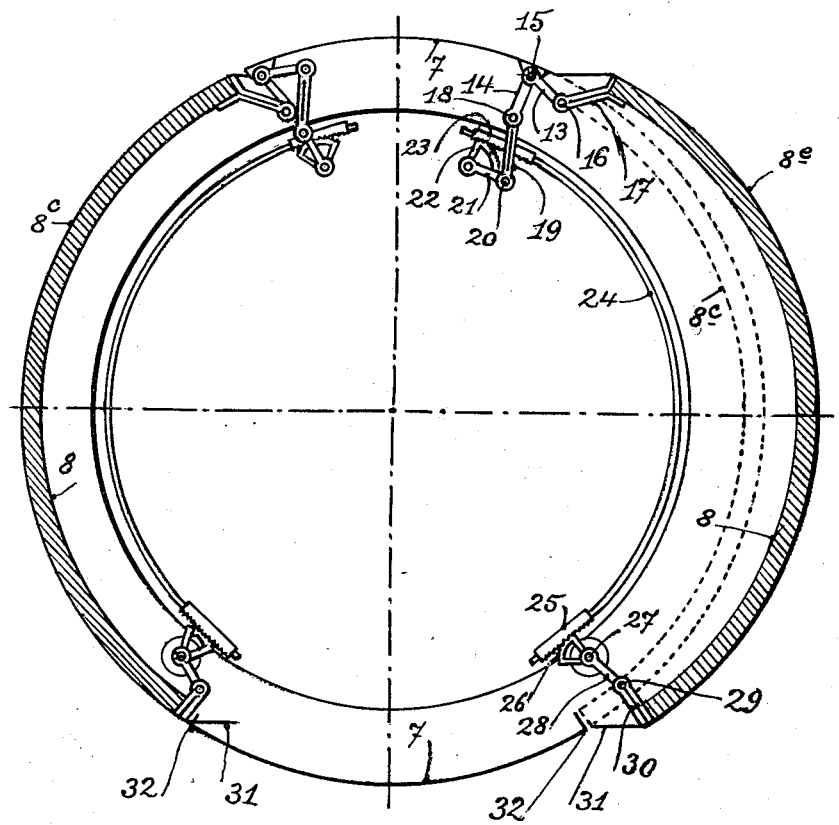

Fig. 6 similar to Fig. 5 refers to a second construction of an extensible ring in accordance with the invention. In these different figures, the same reference numerals designate the same elements.

In Fig. 1, 1 is the cowl, in the interior of which is arranged the engine, in the front part of this cowl is arranged a cap 2 covering the boss of the airscrew. This airscrew is represented here by its axial plane 3; at the rear part of the same cowl, is the fuselage 4 along which flow the streams of air which have brought about the cooling of the engine in the interior of this cowl.

In accordance with the present invention, an extensible ring 5 is arranged at the rear end of the cowl 1; in its contracted position (Figs. 1 and 3), the external face of this ring is situated in the prolongation of the exterior face of the cowl 1 so that the air streams, which have traversed the cowl, flow between the internal face of this ring 5 and the fuselage 4 (Fig. 1). The additional drag resulting from the addition of this ring to the cowl has an extremely small value.

In Figs. 2 and 4, in the position 5′ of extension of the ring, air is admitted to the annular space $a$ created between the cowl 1 and the ring 5′, and by reason of the Venturi-like profile given to the internal face of the ring 5, the air passing through this annular space $a$ brings about by suction an additional intake of air in the interior of the cowl through the section $b$ (Fig. 4) so that the mass of air passing through the interior of the cowl 1 is then increased. Hence there results a more energetic cooling of the engine which permits of requiring from this engine an increase of power for the propulsion of the airframe in which the said engine is installed.

The contractable and expandable ring represented in Figs. 5 and 6 comprises stationary and movable segments. The stationary segments are the segments 7, 7, the movable segments are the segments 8, 8; the contractable and expandable part is formed by these two segments 8, 8. In Fig. 5, each movable segment 8 is carried by three rods 9, 9 and 10, the two first 9, 9 slide in guides 11, 11 fastened to the stationary segments; the third is rigidly connected to a motor piston lodged in a cylinder 12 in communication with a source of fluid under pressure (not shown), this source of pressure being placed under control of the pilot. In these conditions, according as the fluid acts on the piston on one of its sides or on the other, each movable segment of the regulating ring is carried from its position of contraction $8^c$ to its position of expansion $8^e$ or vice versa.

In Fig. 6, each of the segments 8, 8 is carried at one of its extremities by an elbow lever 13—14 pivoting around an axle 15 which is fixed to the stationary segment. One of the arms 13 of this lever is linked at 16 to a rod 17 fastened to one of the segments 8—8, the other arm 14 is linked at 18 to a connecting rod 19 itself mounted at 20 on a lever 21 fixed to a toothed sector 22 in engagement with a circular rack 23 with interior teeth. This rack 23 terminates a rigid or flexible member 24 bent into the arc of a circle carrying at its opposite end another circular rack 25 with external teeth in engagement with a toothed sector 26 mounted on a motor axle 27 fixed to a lever 28 linked at 29 to a rod 30 fixed to the corresponding segment 8 so that when movements are given to the axis 27 by any suitable motor, for example an electric motor placed under the control of the pilot, each segment 8 is carried from its position of contraction $8^c$ to its expanded position $8^e$ or inversely.

In each of the Figs. 5 and 6, at each of its ends, each segment 8 is provided also with a shutter 31. In the contracted position of the segments 8, the shutters 31 are contained in the fixed parts 7 of the ring. When the segments 8 pass from the contracted position to the expanded position of the ring, each of these shutters slips along the corresponding terminal edge 32 of these segments 7 ensuring thus the continuity among themselves of its divers circumferential elements in any position of the ring.

In the case of Fig. 6, these shutters 31 are flexible in a circumferential direction to allow them to follow the swinging movements of the levers 13 and 28 at the time of passage of the segments 8 from one of their positions to the other.

Of course, these methods of rendering the ring of the cowl contractable and expandable have only been given by way of example, numerous other contractable and expandable rings may be used without going outside the scope of the present invention.

As has been said, the latter comprises also the unit formed by a cowl with an expandable and contractable rear ring and the engine used in combination with the said cowl.

I declare that what I claim is:

1. An engine cowl for aircraft comprising a cowl, a ring disposed rearwardly of said cowl, a portion of said ring being movable in a radial direction from the forepart of the cowl to define a correspondent peripheral zone exterior to the said forepart of the cowl for, during forward movement of the engine, effecting an aspiration of the air in the cowl interior by means of the air passing through the said zone when the said radially movable portion is outside of the forepart of the cowl, thus increasing the rate of flow of the cooling air in the interior of the said forepart of the cowl.

2. An engine cowl for aircraft comprising a cowl, a ring disposed rearwardly of said cowl consisting of a fixed peripheral segment and peripheral segments, carried by said fixed segment, movable in a radial direction from the forepart of the said cowl to define correspondent peripheral zones exterior to the said forepart of the cowl for, during forward movement of the engine, effecting an aspiration of the air in the cowl interior by means of the air passing through the said peripheral zone, when the said radially movable segments are outside of the forepart of the cowl, increasing the rate of flow of the cooling air in the interior of the said forepart of the cowl.

3. An engine cowl for aircraft comprising a cowl, a ring disposed rearwardly of said cowl, the inner side of the said ring having, longitudinally, a trumpet shaped section and the said ring being formed of fixed peripheral segments and peripheral segments, carried by said fixed segments, movable in a radial direction from the forepart of the said cowl to define correspondent peripheral zones exterior to the said forepart of the cowl for, during forward movement of the engine, effecting an aspiration of the air in the cowl interior by means of the air passing through the said peripheral zones, when the said radially movable segments are outside of the forepart of the cowl, thus increasing the rate of flow of the cooling air in the interior of the said forepart of the cowl.

4. An engine cowl for aircraft comprising a cowl, a ring disposed rearwardly of said cowl, the inner side of the said ring having, longitudinally, a trumpet shaped section and the said ring being formed of fixed peripheral segments and peripheral segments carried by said fixed segments movable in a radial direction from the forepart of the said cowl to define correspondent peripheral zones exterior to the said forepart of the cowl, means for varying, during forward movement of the engine, the distance of the movable segments from the axis of the cowl, effecting an aspiration of the air in the cowl interior by means of the air passing through the said peripheral zones, when the said radially movable segments are outside of the forepart of the cowl, thus increasing the rate of flow of the cowling air in the interior of the said forepart of the cowl.

5. An engine cowl for aircraft comprising a cowl, a ring disposed rearwardly of the cowl, the inner side of the said ring having, longitudinally, a trumpet shaped section and the said ring being formed of fixed peripheral segments and movable peripheral segments, carried by said fixed segments, mounted on parallel slides perpendicular to the axis of the cowl, said segments being movable in a radial direction from the forepart of the said cowl, to define correspondent peripheral zones exterior to the said forepart of the cowl, means for varying, during forward movement of the engine, the distance of the movable segments from the axis of the cowl, effecting an aspiration of the air in the cowl interior by means of the air passing through the said peripheral zones, when the said radially movable parts are outside of the forepart of the cowl, thus increasing the rate of flow of the cowling air in the interior of the said forepart of the cowl.

6. An engine cowl for aircraft comprising a cowl, a ring disposed rearwardly of the cowl, the inner side of the said ring having, longitudinally, a trumpet shaped section and the said ring being formed of fixed peripheral segments and movable peripheral segments, carried by said fixed segments, pivoted levers of which the axles are fixed to said fixed segments and parallel to the axis of the cowl having each movable segment hung therefrom, said movable segments being movable in a radial direction from the forepart of the said cowl to define correspondent peripheral zones exterior to the said forepart of the cowl, means for varying, during forward movement of the engine, the distance of the movable segments from the axis of the cowl, effecting an aspiration of the air in the cowl interior by means of the air passing through the said peripheral zones, when said radially movable segments are outside of the forepart of the cowl, thus increasing the rate of flow of the cowling in the interior of the said forepart of the cowl.

7. An engine cowl for aircraft comprising a cowl, a ring disposed rearwardly of the cowl, the inner side of the said ring having, longitudinally, a trumpet shaped section and the said ring being formed of fixed peripheral segments, and movable peripheral segments, carried by said fixed segments, a pivoted lever of which the axle is carried by one of the fixed segments and parallel to the axis of the cowl, having each movable segment linked thereto one of said levers being positively actuated, the said segments being movable in a radial direction from the forepart of the said cowl to define correspondent peripheral zones exterior to the said forepart of the cowl, during the forward movement of the engine, effecting an aspiration of the air in the cowl interior by means of the air passing through the said circumferential zones, when the said radially movable parts are outside of the forepart of the cowl, thus increasing the rate of flow of the cooling air in the interior of the said forepart of the cowl.

8. An engine cowl for aircraft comprising a cowl, a ring disposed rearwardly of the cowl, the inner side of the said ring having, longitudinally, a trumpet shaped section and the said ring being formed of fixed peripheral segments and movable peripheral segments, carried by said fixed segments, a pivoted lever for each of said movable segments which is linked at its extremities thereto and which has the axle thereof carried by one of said fixed segments and parallel to the axis of the cowl, one of these levers being positively actuated, a toothed sector, a rack at one end of a member in the form of an arc engaging said toothed sector and connecting said actuated lever with an inactuated lever, a second rack at the other end of said member, a toothed sector engaging said second rack and a connecting rod secured to the said sector and secured to the pivoted lever linked on the extremity of the segment opposed to that bearing the actuated pivoted lever, each movable segment being thus movable in a radial direction from the forepart of the said cowl to define one correspondent peripheral zone exterior to the forepart of the cowl, during the forward movement of the engine, effecting an aspiration of the air in the cowl interior by means of the air passing through the said peripheral zone, when the said radially movable segments are outside of the forepart of the cowl, thus increasing the rate of flow of the cooling air in the interior of the said forepart of the cowl.

9. An engine cowl for aircraft comprising a cowl, a ring disposed rearwardly of said cowl, said ring being formed of fixed segments and segments movable, carried by said fixed segments, in a radial direction from the forepart of the said cowl to define corresponding zones exterior to the said forepart of the cowl, a shutter connecting each movable segment to the adjacent fixed segment of the cowl and said shutter being mounted at each of the longitudinal ends of this segment.

10. An engine cowl for aircraft comprising a cowl, a ring disposed rearwardly of the cowl, the inner side of said ring having, longitudinally, a trumpet shaped section and the said ring being formed of fixed peripheral segments and movable peripheral segments, carried by said fixed segments a pivoted lever for each of said movable segments which is linked at its extremities thereto and which has the axle thereof carried by one of said fixed segments and parallel to the axis of the cowl, one of these levers being positively actuated, a toothed sector, a rack, engaging said sector, formed at one end of a member in the form of an arc, a second rack at the other end of said member, a toothed sector engaging said second rack and a connecting rod secured to the said sector and secured to the pivoted lever linked on the extremity of the segment opposed to that bearing the actuated pivoted lever, each movable segment being thus movable in a radial direction from the forepart of the said cowl to define correspondent peripheral zones exterior to the said forepart of the cowl, during the forward movement of the engine, effecting an aspiration of the air in the cowl interior by means of the air passing through the said peripheral zones, when the said radially movable parts are outside of the forepart of the cowl, thus increasing the rate of flow of the cooling air in the interior of the said forepart of the cowl, a shutter connecting each movable segment to the adjacent fixed segment of the cowl and said shutter being mounted at each of the longitudinal ends of this segment.

11. An engine cowl for aircraft comprising a cowl, a ring disposed rearwardly of the cowl, the inner side of the said ring having, longitudinally, a trumpet shaped section and the said ring being formed of fixed circular segments, carried by said fixed segments, movable in a radial direction from the forepart of the said cowl to define correspondent peripheral zones exterior to the said forepart of the cowl, a motor cylinder having fluid under pressure for varying, during forward movement of the engine, the distance of a movable segment from the axis of the cowl, thus effecting an aspiration of the air in the cowl interior by means of the air passing through the said circumferential zones, when the said radially movable parts are outside of the forepart of the cowl, thus increasing the rate of flow of the cooling air in the interior of the said forepart of the cowl.

12. An engine cowl for aircraft comprising a cowl, a ring disposed at the end of the rear part of said cowl as a streamlined longitudinal extension of said cowl, a portion of said ring being in flight movable parallel to itself in a radial direction from the forepart of the cowl to define in flight a corresponding peripheral zone on the exterior of said forepart of said cowl, means for removing radially and temporarily in flight said movable portion of said ring from the fixed part of the ring and, thus, during forward movement of the engine, effecting a temporary aspiration of the air in said cowl interior by means of the air passing through said zone when said radially movable portion is outside of the forepart of said cowl, thus temporarily increasing the rate of flow of the cooling air in the interior of said forepart of said cowl.

13. An engine cowl for aircraft comprising a cowl, a ring disposed at the end of the rear part of said cowl as a streamlined longitudinal extension of said cowl consisting of fixed peripheral segments and peripheral segments, carried by said fixed segments, movable in flight parallel to themselves in a radial direction from the forepart of said cowl to define in flight corresponding peripheral zones exteriorly of said forepart of the cowl, means for removing radially and temporarily in flight said movable portions of said ring from the fixed part of said ring and, thus, during forward movement of the engine, effecting a temporary aspiration of the air in said cowl interior by means of the air passing through said peripheral zone, when said radially movable segments are outside of the forepart of said cowl, thus temporarily increasing the rate of flow of the cooling air in the interior of said forepart of said cowl.

14. An engine cowl for aircraft comprising a cowl, a ring disposed at the end of the rear part of said cowl as a streamlined longitudinal extension of said cowl, the inner side of the said ring having, longitudinally, a trumpet shaped section and said ring being formed of fixed peripheral segments and peripheral segments, carried by said fixed segments, movable, in flight, parallel to themselves in a radial direction from the forepart of said cowl to define, in flight, corresponding peripheral zones exteriorly of said forepart of said cowl, means for removing radially and temporarily in flight the said movable portions of said ring from the fixed part of said ring and, thus, during forward movement of the engine, effecting a temporary aspiration of the air in said cowl interior by means of the air passing through said peripheral zones, when said radially movable segments are outside of the forepart of said cowl, thus temporarily increasing the rate of flow of the cooling air in the interior of said forepart of said cowl.

15. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed peripheral segments and peripheral segments carried by said fixed segments movable in flight parallel to themselves in a radial direction from the forepart of said cowl to define in flight corresponding peripheral zones exteriorly of said forepart of said cowl, means for temporarily varying, during forward movement of the engine, the distance of the movable segments from the axis of said cowl, effecting a temporary aspiration of the air in said cowl interior by means of the air passing through said peripheral zones, when the said radially movable segments are outside of the forepart of said cowl, thus temporarily increasing the rate of flow of the cowling air in the interior of said forepart of said cowl.

16. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed peripheral segments and movable peripheral segments, carried by said fixed segments mounted on parallel slides perpendicular to the axis of said cowl, said segments being movable in flight, parallel to themselves in a radial direction from the forepart of said cowl, to define in flight corresponding peripheral zones exteriorly of said forepart of said cowl, means for temporarily varying, during forward movement of the engine, the distance of the movable segments from the axis of said cowl, effecting a temporary aspiration of the air in the cowl interior by means of the air passing through said peripheral zones, when said radially movable parts are outside of the forepart of said cowl, thus temporarily increasing the rate of flow of the cowling air in the interior of said forepart of said cowl.

17. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed peripheral segments and movable peripheral segments, carried by said fixed segments, pivoted levers of which the axles are fixed to said fixed segments and parallel to the axis of said cowl having each movable segment hung therefrom, said movable segments being movable in flight parallel to themselves in a radial direction from the forepart of said cowl to define in flight corresponding peripheral zones exteriorly of said forepart of said cowl, means for temporarily varying, during forward movement of the engine, the distance of the movable segments from the axis of said cowl, effecting a temporary aspiration of the air in said cowl interior by means of the air passing through said peripheral zones, when said radially movable segments are outside of the forepart of said cowl, thus temporarily increasing the rate of flow of the cowling in the interior of said forepart of said cowl.

18. An engine cowl for aircraft comprising a cowl, a ring disposed at the end of the rear part of said cowl as a streamlined longitudinal extension of said cowl, the inner side of said ring having, longitudinally, a trumpet shaped section and the said ring being formed of fixed peripheral segments, and movable peripheral segments, carried by said fixed segments, a pivoted lever of which the axle is carried by one of the fixed segments and parallel to the axis of said cowl, having each movable segment linked thereto, one of said levers being positively actuated, said segments being movable in flight parallel to themselves in a radial direction from the forepart of said cowl to define temporarily corresponding peripheral zones exteriorly of said forepart of said cowl, during the forward movement of the engine, effecting a temporary aspiration of the air in said cowl interior by means of the air passing through said peripheral zones, when said radially movable parts are outside of the forepart of said cowl, thus temporarily increasing the rate of flow of the cooling air in the interior of said forepart of said cowl.

19. An engine cowl for aircraft comprising a cowl, a ring disposed at the end of the rear part of said cowl as a streamlined longitudinal extension of said cowl, the inner side of the said ring having, longitudinally, a trumpet shaped section and said ring being formed of fixed peripheral segments and movable peripheral segments, carried by said fixed segments, a pivoted lever for each of said movable segments which is linked at its extremities thereto and which has the axle thereof carried by one of said fixed segments and parallel to the axis of said cowl, means for positively and temporarily actuating in flight one of these levers, a toothed sector, a rack at one end of a member in the form of an arc engaging said toothed sector and connecting said actuated lever with an inactuated lever, a second rack at the other end of said member, a toothed sector engaging said second rack and a connecting rod secured to said sector and secured to the pivoted lever linked on the extremity of the segment opposed to that bearing the actuated pivoted lever, each movable segment being thus temporarily movable in a radial direction from the forepart of said cowl to temporarily define one corresponding peripheral zone exteriorly of the forepart of the cowl, during the forward movement of the engine, effecting a temporary aspiration of the air in said cowl interior by means of the air passing through said peripheral zone, when said radially movable segments are outside of the forepart of said cowl, thus temporarily increasing the rate of flow of the cooling air in the interior of said forepart of said cowl.

20. An engine cowl for aircraft comprising a cowl, a ring disposed at the end of the rear part of said cowl as a streamlined longitudinal extension of said cowl, said ring being formed of fixed segments and segments movable parallel to themselves carried by said fixed segments, in a radial direction from the forepart of said cowl to temporarily define corresponding zones exteriorly of said forepart of said cowl, a shutter connecting each movable segment to the adjacent fixed segment of said cowl and said shutter being mounted at each of the longitudinal ends of this segment.

21. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed peripheral segments and movable peripheral segments, carried by said fixed segments, a pivoted lever for each of said movable segments which is linked at its extremities thereto and which has the axle thereof carried by one of said fixed segments and parallel to the axis of said cowl, means for temporarily and positively actuating one of these levers, a toothed sector, a rack, engaging said sector, formed at one end of a member in the form of an arc, a second rack at the other end of said member, a toothed sector engaging said second rack and a connecting rod secured to said sector and secured to the pivoted lever linked on the extremity of the segment opposed to that bearing the actuated pivoted lever, each movable segment being thus temporarily movable parallel to itself in a radial direction from the forepart of the said cowl to temporarily define corresponding peripheral zones exteriorly of said forepart of said cowl, during the forward movement of the engine, effecting a temporary aspiration of the air in said cowl interior by means of the air passing through said peripheral zones, when the said radially movable parts are outside of the forepart of said cowl, thus temporarily increasing the rate of flow of the cooling air in the interior of said forepart of said cowl, a shutter connecting each movable segment to the adjacent fixed segment of said cowl and said shutter being mounted at each of the longitudinal ends of this segment.

22. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed circular segments, further circular segments, carried by said fixed segments, movable parallel to themselves in a radial direction from the forepart of said cowl to temporarily define corresponding peripheral zones exteriorly of said forepart of said cowl, means having fluid under pressure for temporarily varying, during forward movement of the engine, the distance of a movable segment from the axis of the cowl, thus effecting a temporary aspiration of the air in the cowl interior by means of the air passing through said peripheral zones, when said radially movable parts are outside of the forepart of said cowl, thus temporarily increasing the rate of flow of the cooling air in the interior of said forepart of said cowl.

23. An engine cowl for aircraft comprising a cowl, a ring disposed at the end of the rear part of said cowl as a streamlined longitudinal extension of said cowl, the inner side of said ring having, longitudinally, a trumpet shaped section and said ring being formed of fixed peripheral segments and further peripheral segments, carried by said fixed segments, movable parallel to themselves in a radial direction from the forepart of said cowl to temporarily define corresponding peripheral zones exteriorly of said forepart of said cowl, electric means for temporarily varying, during forward movement of the engine, the distance of a movable segment from the axis of the cowl, thus effecting a temporary aspiration of the air in said cowl interior by means of the air passing through said peripheral zones, when said radially movable parts are outside of the forepart of said cowl, thus temporarily increasing the rate of flow of the cooling air in the interior of said forepart of said cowl.

LOUIS MARY MICHARD.

REFERENCES CITED

The following references are of record in the file of this patent:

UNITED STATES PATENTS

| Number | Name | Date |
|---|---|---|
| 2,150,143 | Adams | Mar. 14, 1939 |
| 2,212,094 | Adolph | Aug. 30, 1940 |
| 2,248,150 | Wilson et al. | July 8, 1941 |
| 2,387,708 | Arnhym | Oct. 30, 1945 |
| 2,424,335 | Scrymgeour | July 22, 1947 |

FOREIGN PATENTS

| Number | Country | Date |
|---|---|---|
| 484,300 | Great Britain | May 2, 1938 |

OTHER REFERENCES

Ser. No. 296,469, Schnetzer (A. P. C.), published May 11, 1943.

Ser. No. 326,141, Ramshorn (A. P. C.), published May 11, 1943.